United States Patent
Baranowski et al.

(10) Patent No.: US 12,184,048 B2
(45) Date of Patent: Dec. 31, 2024

(54) STRIPPING METHOD FOR CONDUCTOR ELEMENTS FOR A HAIRPIN COIL

(71) Applicant: Ford Global Technologies, LLC, Dearborn, MI (US)

(72) Inventors: Thomas Baranowski, Würselen (DE); Julius Maximilian Engelke, Aachen (DE); Maira Magnani, Aachen (DE); Maik Broda, Würselen (DE); Raphael Koch, Odenthal (DE); Marcel Mathissen, Übach-Palenberg (DE)

(73) Assignee: Ford Global Technologies, LLC, Dearborn, MI (US)

(*) Notice: Subject to any disclaimer, the term of this patent is extended or adjusted under 35 U.S.C. 154(b) by 600 days.

(21) Appl. No.: 17/463,921

(22) Filed: Sep. 1, 2021

(65) Prior Publication Data

US 2022/0069554 A1    Mar. 3, 2022

(30) Foreign Application Priority Data

Sep. 2, 2020  (DE) .......................... 102020211026.3

(51) Int. Cl.
*H02G 1/12* (2006.01)

(52) U.S. Cl.
CPC .......... *H02G 1/127* (2013.01); *H02G 1/1265* (2013.01)

(58) Field of Classification Search
CPC .. H02G 1/127; H02G 1/1265; H02K 15/0421; H02K 15/0068
See application file for complete search history.

(56) References Cited

U.S. PATENT DOCUMENTS

| | | | | | |
|---|---|---|---|---|---|
| 2,880,635 | A | * | 4/1959 | Harris | H02G 1/1265 81/9.51 |
| 4,869,135 | A | * | 9/1989 | Hoffa | H02G 1/1265 81/9.51 |
| 4,942,789 | A | * | 7/1990 | Hoffa | H02G 1/1265 81/9.51 |
| 5,582,078 | A | * | 12/1996 | Talley | H02G 1/1265 81/9.42 |
| 5,596,802 | A | * | 1/1997 | Koch | H02G 1/1265 29/748 |

(Continued)

FOREIGN PATENT DOCUMENTS

| | | |
|---|---|---|
| CN | 105576861 | 5/2016 |
| DE | 10258029 | 1/2010 |

(Continued)

OTHER PUBLICATIONS

Search Report issued to corresponding DE Application No. 102020211026.3, issued Nov. 13, 2021.

*Primary Examiner* — Jeffrey T Carley
*Assistant Examiner* — Jose K Abraham
(74) *Attorney, Agent, or Firm* — Burris Law, PLLC

(57) ABSTRACT

A method of manufacturing a plurality of conductor elements includes providing the plurality of conductor elements, each conductor element includes a conductor end section having an electrically insulating surface coating; securing the conductor end sections of the conductor elements with respect to each other; and simultaneously removing at least a portion of the electrically insulating surface coatings of the conductor end sections using a machining surface of a stripping tool being moved along the conductor end sections.

18 Claims, 11 Drawing Sheets

(56) References Cited

U.S. PATENT DOCUMENTS

| | | | | |
|---|---|---|---|---|
| 5,797,299 | A * | 8/1998 | Long, Jr. | B21F 11/00 |
| | | | | 81/9.51 |
| 7,480,987 | B1 | 1/2009 | Guercioni | |
| 7,597,030 | B2 * | 10/2009 | Stepan | G02B 6/566 |
| | | | | 81/9.42 |
| 8,443,509 | B1 * | 5/2013 | De Souza | H02K 15/0081 |
| | | | | 29/598 |
| 9,847,683 | B2 * | 12/2017 | Jung | H02K 11/0094 |
| 9,876,413 | B2 * | 1/2018 | Hayashi | H02K 15/0421 |
| 2008/0257112 | A1 * | 10/2008 | Stepan | G02B 6/4497 |
| | | | | 81/9.51 |
| 2010/0325874 | A1 * | 12/2010 | Wang | H02K 15/0081 |
| | | | | 29/596 |
| 2015/0128414 | A1 * | 5/2015 | Haslinger | H02G 1/1295 |
| | | | | 29/749 |
| 2016/0233652 | A1 * | 8/2016 | Goto | H01B 7/0009 |
| 2018/0083429 | A1 * | 3/2018 | Sakamoto | H02G 1/1253 |
| 2018/0131260 | A1 * | 5/2018 | Hayashi | H02K 15/0421 |
| 2019/0280574 | A1 * | 9/2019 | Shirai | H02G 1/128 |
| 2019/0280577 | A1 * | 9/2019 | Ponzio | H02K 15/024 |
| 2019/0393685 | A1 * | 12/2019 | Sedlacek | H02G 1/127 |
| 2020/0076174 | A1 * | 3/2020 | Numazawa | H02G 1/127 |
| 2022/0200224 | A1 * | 6/2022 | Sorg | H01R 43/20 |

FOREIGN PATENT DOCUMENTS

| | | | | |
|---|---|---|---|---|
| JP | | 5681248 B1 * | 3/2015 | ......... H02K 15/0421 |
| WO | | 2019007459 | 1/2019 | |
| WO | | 2020051610 | 3/2020 | |

* cited by examiner

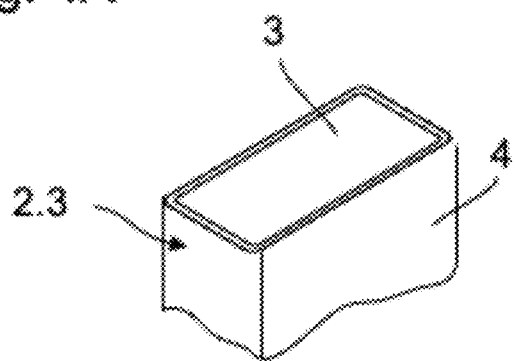
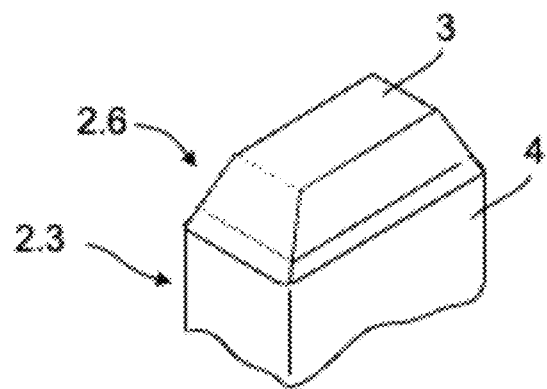

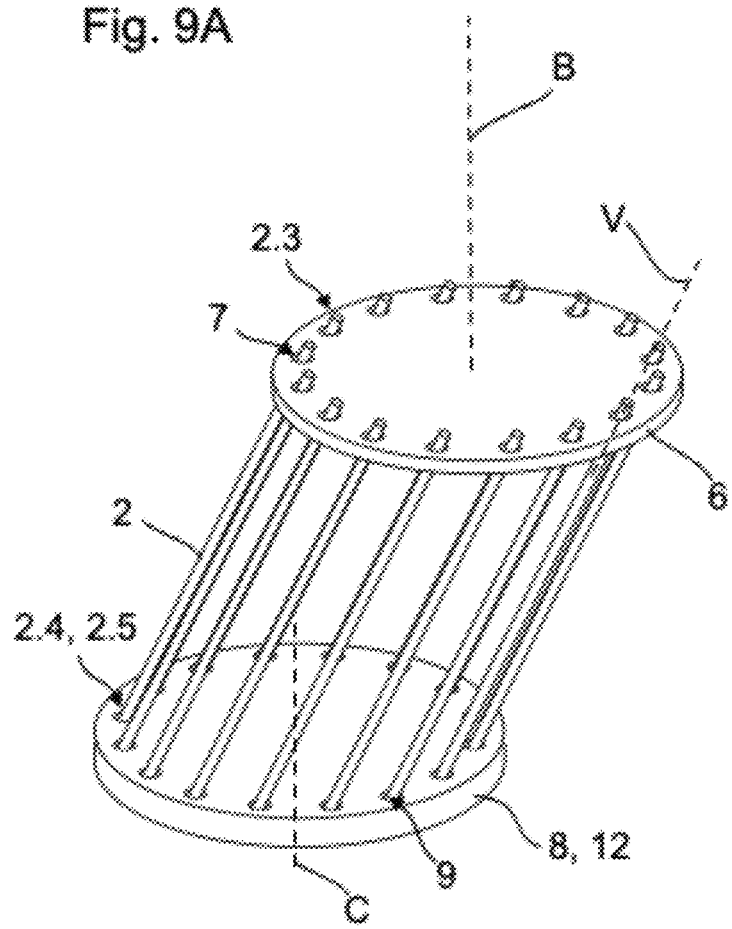

STRIPPING METHOD FOR CONDUCTOR ELEMENTS FOR A HAIRPIN COIL

CROSS-REFERENCE TO RELATED APPLICATIONS

This application claims priority to and the benefit of German Patent Application No. 102020211026.3, filed on Sep. 2, 2020. The disclosure of the above application is incorporated herein by reference.

FIELD

The present disclosure relates to a stripping method for conductor elements for a hairpin coil.

BACKGROUND

The statements in this section merely provide background information related to the present disclosure and may not constitute prior art.

Electric motors are used in various fields of technology, including, for example, motor vehicle construction. In addition to traditional types of electric motors, in which a coil has a wire which is wound around a ferromagnetic core, normally a laminated core, "hairpin coils" are also known. In the case of the latter, it is not a single wire that is wound but individually prefabricated conductor elements, resembling hairpins, that are arranged on the stator or rotor in an intended configuration and then electrically connected, thus together forming the coil. As a general rule, the conductor elements consist of copper or a copper alloy. Conductor piece ends provided for connection are usually arranged directly adjacent to one another and are then electrically connected, for example by means of laser welding. In comparison with the traditional winding of a coil, various advantages are obtained, for example a better slot filling ratio, i.e. a better ratio between the assembled cross-sectional area of the conductors in a slot of the stator and the cross-sectional area of the slot itself. It is thereby possible to reduce the amount of copper, and motors with higher power or with a smaller form factor can be produced. In order to inhibit short circuits, the prefabricated conductor elements are normally provided completely with an insulating coating (insulating varnish or the like). In order to be able to produce the electrical connection, the coating must be removed at the ends to be connected, e.g. mechanically, chemically or by means of a laser. This usually takes place on each individual conductor element before the conductor elements are applied to the stator or rotor, which complicates the entire production process.

U.S. Pat. No. 7,480,987 B1 discloses a method for preforming insulated conductors for motor rotors and stators. An insulated wire of rectangular cross section is unwound from a coil, straightened, stripped over a predetermined length, fed to a bending device, cut to length and then bent into the desired hairpin shape. Stripping takes place successively on opposite sides of the wire. A grinding disk engages one side while the wire is supported on the opposite side by a supporting roller.

CN 105576861 A discloses a method for producing a hairpin winding motor using a stator plate and a stator core with a plurality of slots. First, a bent insulating paper is introduced into each slot of the stator core. The individual hairpin conductors are then shaped and stripped. This is followed by the arrangement of stator plates on both sides of the stator core and introduction of the hairpin conductors into the insulating paper and the carrying out of a twisting operation on the rear part of the hairpin conductors. Stripping can be accomplished by milling, grinding or chemical treatment.

DE 102 58 029 B4 shows a positioning and clamping device for positioning and clamping at least one wire end for the purpose of further processing in the course of producing a machine element of an electric machine. The device comprises a catching device for catching and positioning the at least one wire end, the catching device having at least one oblique guide for the relative positioning of the at least one wire end.

In view of the prior art indicated, the efficiency of stripping the conductor elements for the production of a hairpin coil still leaves room for improvements. This applies particularly to the process time required for stripping the conductor elements.

SUMMARY

This section provides a general summary of the disclosure and is not a comprehensive disclosure of its full scope or all of its features.

The present disclosure provides for efficient stripping of the conductor elements for the production of a hairpin coil.

According to one form, the present disclosure discloses a method of manufacturing a plurality of conductor elements for a hairpin coil. The method comprises providing the plurality of conductor elements, each conductor element including a conductor end section having an electrically insulating surface coating; securing the conductor end sections of the conductor elements with respect to each other; and simultaneously removing at least a portion of the electrically insulating surface coatings of the conductor end sections using a machining surface of a stripping tool being moved along the conductor end sections. The dependent claims relate to advantageous variations of the present disclosure.

It should be noted that the features and measures presented individually in the following description can be combined with one another in any technically feasible manner and indicate further variations of the disclosure. The description additionally characterizes and specifies the disclosure, in particular in conjunction with the figures.

The present disclosure provides a method of manufacturing a plurality of conductor elements for hairpin coils. The term "hairpin coil" refers here to a coil whose conductors or winding does not consist of a continuous wound wire but of individual, prefabricated and subsequently electrically interconnected conductor elements which are of hairpin-like configuration and are sometimes also referred to as "hairpin conductors" or "hairpin elements". In particular, the hairpin coil can be part of an electric motor. It may, in particular, be the coil of a stator or the coil of a rotor of the electric motor. The electric motor may be a traction motor or drive motor of an electric vehicle.

According to one step of the method, a plurality of conductor elements is provided which each have an electrically insulating surface coating and conductor end sections. The respective conductor element has a conductive core made of copper or a copper alloy. It furthermore has an electrically insulating surface coating, which is typically an insulating varnish. The cross section of the conductor elements can, for example, be round, in particular circular, or polygonal, in particular rectangular. The prefabricated conductor elements used in the method according to the present disclosure normally includes a surface coating which covers the entire surface, if appropriate apart from end faces along which the conductor element has been cut off, e.g. from a wire. The corresponding surface coating may have been applied by dipping or spraying onto the conductor elements or onto a wire from which the conductor elements have been cut, for example. The surface coating is electrically insulating and has at least one material which can be classified as an electrical nonconductor (e.g., with an electrical conductivity of typically less than $10^{-8}$ S/m). The electrically insulating effect of the surface coating also depends, in particular, on its thickness. This is selected in such a way that, in accordance with the voltages to be expected, at most a negligible current flow through the surface coating is possible during normal operation of the hairpin coil. Each conductor element has conductor end sections, which are arranged at the end of the conductor element. Like the rest of the conductor element, conductor end sections have the surface coating and are normally predominantly covered with it at the beginning of the method.

In a further step, the conductor end sections of the plurality of conductor elements are secured with respect to one another. That is, the conductor end sections are secured against displacement relative to one another, normally by means of a positive connection and, if appropriate, by means of a nonpositive connection. Under certain circumstances, it can also be stated that the conductor end sections are locked with respect to one another. The relative positions are secured in such a way that the conductor end sections are spaced apart or arranged at a distance from one another in pairs. Insofar as the conductor elements and thus also the conductor end sections have a certain flexibility, it is possible for the conductor end sections not to be completely locked as a whole, but only in some region or regions, while a (slight) displacement relative to one another is possible in other regions. Insofar as each conductor element has two conductor end sections, it is possible for only the relative positions of one conductor end section per conductor element to be secured, or else the relative positions of both conductor end sections. While the relative positions of the conductor end sections with respect to one another are secured, it is possible within the scope of the method for the position or orientation of the conductor end sections to change or be actively changed with respect to a fixed reference point. Before the relative positions are secured, it is possible, in particular, for the conductor end sections to be aligned, this corresponding to adjustment of the relative positions of the conductor end sections.

In a further method step, a plurality of conductor end sections of a plurality of conductor elements is stripped simultaneously by removing the surface coating at least in some region or regions, in that a machining surface of a stripping tool is moved along the plurality of conductor end sections in a simultaneous removal action. That is, in the case of a plurality of conductor end sections which are of a plurality or to different conductor elements, stripping takes place simultaneously. The surface coating of the respective conductor end section is removed at least in some region or regions by the stripping process. In this case, a machining surface of the stripping tool is moved along the plurality of conductor end sections in a simultaneous removal action. In other words, the machining surface moves relative to the conductor end sections along the latter, being in contact with the conductor end sections and performing a removal action on the latter. In this context, "a removal action" refers to mechanical removal by machining, e.g. by grinding. The stripping tool is motor-driven.

The stripping tool or the part which forms the machining surface can consist of different materials, e.g. a metal or ceramic. In order to inhibit premature wear, the hardness of the corresponding material should be significantly greater than that of the surface coating to be removed and normally also greater than the hardness of the material of which the conductor elements consist (e.g. copper or copper alloy). Insofar as reference is made here and in the following to the machining surface and its shape, this relates to the general shape overall rather than to the fine structure. The latter is generally complex since the machining surface must have a certain roughness to achieve mechanical removal. To allow effective removal, a certain contact pressure must also be produced between the stripping tool with the machining surface and the respective conductor end section. The securing of the relative positions of the conductor end sections can also serve to allow the contact pressure to be built up without the conductor end sections being displaced to an excessive extent. According to the disclosure, therefore, there is no successive stripping of individual conductor end sections, but a plurality of conductor end sections of a plurality of conductor elements is stripped simultaneously, in that the machining surface acts simultaneously on these conductor end sections. As a result of the stripping being carried out in parallel on a plurality of conductor end sections, the method is time-efficient. Moreover, mechanical removal can be achieved cost-effectively by means of the stripping tool.

After stripping, the conductor end sections can be electrically connected in accordance with a desired wiring configuration, e.g. by welding. Between the stripping according to the present disclosure and the electrical connection, one or more working steps can be carried out, for example bending of the conductor end sections, thus providing the conductor end sections to be connected adjacent to one another.

In the course of the production of the hairpin coil, the conductor elements are positioned on a coil support, being of hairpin-like configuration, which means that they normally have two legs which extend in one direction of extension, and an arched section which connects these legs. The legs can be of straight configuration at least in some section or sections and/or can run parallel to one another. The arched section can be of curved and/or angled configuration. In this context, the conductor end sections are normally part of the abovementioned limbs of the conductor element. The hairpin-like shape or U shape is normally produced by bending the conductor elements after they have been cut off, e.g. from a wire, in which case they are initially stretched or slightly bent. As will be explained below, the stripping according to the present disclosure can take place before or after the hairpin-like shape has been imparted to the conductor elements.

The coil support can be of single- or multi-part configuration and generally forms a common base, on which the conductor elements can be positioned and mounted, e.g. by means of positive engagement. Typically, the coil support can have a roughly cylindrical or cylindrically symmetrical shape. It can have a ferromagnetic coil core, for example. The positioning of the conductor elements on the coil support or the insertion of the conductor elements into the coil support is normally carried out automatically by a machine. The conductor elements are positioned on the coil support in such a way that the conductor end sections protrude from the coil support, i.e. stick out from the coil support or project with respect to the latter. When the conductor elements are positioned on the coil support, normally all the conductor end sections are aligned parallel to one another and parallel to a central axis or axis of symmetry of the coil support. Each conductor element has two conductor end sections. The conductor end sections of all the conductor elements usually protrude from the coil support on one side after insertion, while the arched sections of the conductor elements are arranged on an opposite side. Even if stripping is carried out after the conductor elements have been shaped like hairpins, it may be performed before or after the conductor elements have been positioned on the coil support.

According to one form, the relative positions of the conductor end sections are secured by positioning a mask having a plurality of through-openings in such a way that in each case one conductor end section is accommodated with positive engagement in a through-opening and protrudes through the latter. The mask is normally of integral configuration and can consist of metal or ceramic, for example. In particular, it can be configured as a flat disk. It has a plurality of through-openings, one through-opening being provided for each conductor end section. In order to lock the conductor end sections with respect to one another, they are passed partially through the through-openings and, as a result, they protrude through them. In this case, the respective through-opening is configured in such a way that it can accommodate the conductor end section with positive engagement. The positive connection can optionally be supplemented by a nonpositive connection, with the result that the conductor end section is clamped in the through-opening. On the other hand, the through-opening can also be configured in such a way that the conductor end section can be accommodated with play or at a (slight) distance from the edge of the through-opening. It is thereby possible, in particular, for the conductor end section to tilt to different extents within the through-opening. It is also possible for the through-openings to be open at the edge and, as it were, to be configured as notches or slots at the edge, into which the conductor end section can be inserted laterally. The cross section of each through-opening can taper from the edge to a desired end position of the conductor end section. That is, the cross section can have a wedge-shaped or funnel-shaped cross section making it easier to introduce the conductor end section laterally. Apart from the through-openings provided for the conductor end sections, the mask can be continuous. In addition to its locking function, the mask may possibly also serve to collect material which becomes detached from the conductor end sections during stripping.

After all the conductor end sections have been stripped, the mask can be removed again. The mask is removed and reused after stripping. It can be used successively in a multiplicity of process runs. This is possible especially because the mask itself is normally not exposed to any significant mechanical or thermal stress. The reusability can also be supported by the use of hard-wearing materials such as, for example, stainless steel or ceramic, for the manufacture of the mask.

As mentioned above, the conductor end sections can be positioned before the relative positions are secured. According to one form, the plurality of conductor end sections extend parallel to each other before securing the relative positions and, during stripping, the machining surface is positioned oblique with respect to the direction of extent of the plurality of conductor end sections. In this context, the term "parallel" should not be understood in the strictly mathematical-geometric sense. That is, the position of the conductor end sections with respect to one another may also differ slightly from one another, for example by a maximum of 5°. In this sense, all the conductor end sections can be characterized (approximately) by a common direction of extent. During stripping, the machining surface, which can, in particular, be flat, but does not have to be, is positioned oblique with respect to the direction of extent of the conductor end sections (i.e., neither parallel with respect to the direction of extent of the conductor end sections nor perpendicularly with respect thereto). A chamfer or bevel is thus produced when the machining surface interacts with the respective conductor end section. It can also be stated that the respective conductor end section is chamfered by the machining surface.

In another form, during stripping, the plurality of conductor end sections are held parallel and the direction of extent thereof with respect to the machining surface is changed in such a way that different parts of the conductor end sections are stripped in succession. That is, the direction of extent with respect to the machining surface is changed, as a result of which different parts of the respective conductor end section successively come into contact with the machining surface and are stripped as described. In particular, these may be different sides of the conductor end section. Correspondingly, the chamfer described above is produced on different sides, optionally also circumferentially around the entire conductor end section. In particular, an angle of inclination of the conductor end sections with respect to the machining surface (i.e., the angle between the direction of extent of the conductor end sections and the machining surface) can be kept constant, while the direction of extent with respect to the machining surface is changed. The machining surface can act continuously on the conductor end sections while the direction of extent is changed. Alternatively or additionally, the action of the machining surface can be temporarily interrupted while the direction of extent is changed. Insofar as this is possible in view of the shape of the conductor elements and securing the conductor elements, it is desirable that the change in the direction of extent of the conductor end sections with respect to the machining surface is accomplished by a change in position of the conductor elements as a whole, for example in such a way that the respective conductor element as a whole is inclined and/or rotated. It is also conceivable that a change in the direction of extent of the conductor end sections takes place with the conductor end sections being held parallel at the same time, in that the conductor end sections are successively bent in different directions with respect to the remainder of the respective conductor element.

The relative positions of securing sections of the plurality of conductor elements with respect to one another are secured by a securing device, wherein the securing sections are spaced apart from the conductor end sections which are being stripped. That is, relative positions of at least two different sections of the conductor elements are secured, namely, on the one hand, those of the conductor end sections which are being stripped, and, on the other hand, those of the securing sections which are spaced apart from the conductor end sections being stripped. It is thereby possible, on the one hand, for the individual conductor element to be better stabilized and also, on the other hand, for possible guidance or realignment of the conductor elements to be better implemented. If, as above, a mask is used for securing the conductor end sections, the securing device is normally arranged on a side of the mask facing away from the stripping tool, e.g. below the mask if the stripping tool is arranged above the mask. It is possible, in particular, for the securing sections to be accommodated with positive engagement in the securing device. The securing device can be configured in different ways, e.g. as a second mask which, like the first mask described above, can have second through-openings. The securing device is normally of integral configuration and can consist of metal or ceramic, for example. In particular, it can be configured as a flat disk.

In some forms, the securing device can also be formed at least partially by the above-described coil support of the hairpin coil. In this case, stripping is performed after the conductor elements have been shaped like hairpins and positioned on the coil support.

According to another form, first conductor end sections of the conductor elements are stripped and opposite, second conductor end sections form the securing sections. In this context, the conductor end section which is being stripped is referred to as the "first" conductor end section, while the other, opposite, conductor end section of the respective conductor element is referred to as the "second" conductor end section. These designations are used exclusively for conceptual distinction and should not be interpreted to the effect that the first and second conductor end sections are physically distinguishable. In this form, the respective conductor element is thus secured at opposite conductor end sections. On the one hand, this can facilitate securing or guidance since the two conductor end sections are at a comparatively large distance from one another. On the other hand, the arrangement of the second conductor end sections at the ends can facilitate attachment to the securing device. In this form, the respective conductor element is provided in an extended form and remains in an extended form, that is to say, for example, straight, during stripping. After the stripping of the first conductor end sections, all the conductor elements can be reversed, and the opposite conductor end sections are stripped, the previously stripped conductor end sections functioning as securing sections. After stripping, the respective conductor element can, for example, be bent into a hairpin-like shape or U shape and inserted into a coil support.

It is also possible within the scope of the disclosure for the conductor elements to be provided in the form of hairpins before stripping, that is to say already to have two legs and an arched section. In this form, the conductor end sections are formed on the legs. In this case, the first and second conductor end sections can be stripped simultaneously, while the arched sections can form the securing sections. If a mask is used, it can have two through-openings for each conductor element, that is to say one for the first conductor end section and one for the second conductor end section.

In particular, but not exclusively, when the second conductor end sections form the securing sections, the securing device can have a plurality of blind openings, wherein the relative positions of the securing sections are secured by each securing section being inserted into a blind opening. The blind openings, which may also be referred to as depressions or blind recesses, serve to accommodate the respective securing section, e.g. the second conductor end section, with positive engagement. Since these are blind openings (i.e., openings which are not through-openings), the relative positions of the securing sections are, on the one hand, secured, and, on the other hand, the securing section and thus the conductor element as a whole are also supported. For example, the securing device could be of disk-type configuration and could be arranged horizontally, the blind openings being arranged on the upper side without passing through to the underside. The conductor elements can be supported on the underside by the securing device, in order, for example, to counteract a downward-acting force component on the part of the stripping tool (and, of course, the weight of the conductor elements). In some forms, the securing device can be of similar configuration to the mask, where the arrangement of the blind openings corresponds to that of the through-openings, but with the difference that the former are not configured to be through-openings.

In one form, during stripping, a relative movement of the mask and the securing device takes place in accordance with a circular path, as a result of which the direction of extent of the plurality of conductor end sections is changed with respect to the securing device. The movement of the mask relative to the securing device can be achieved by a movement of the mask and/or a movement of the securing device. If the movement of the mask is considered from the point of view of the security device, it corresponds to a circular path. The mask as a whole encircles or revolves around a point which is stationary with respect to the securing device. It is also possible to refer to the circular path as the orbit of the mask. Thus, while the mask is moved relative to the securing device on the circular path, there is normally no twisting of the mask with respect to the securing device. Conversely, the securing device likewise moves on a circular path with respect to the mask. The relative movement can be achieved, on the one hand, by means of an encircling (i.e., eccentric-like movement of the mask with the securing device stationary). On the other hand, it can be implemented by an encircling movement of the securing device with the mask stationary. Finally, it can be achieved if both the mask and the securing device are rotated at the same angular speed about respective axes of rotation which run parallel to one another but are offset relative to one another. The described relative movement of the mask with respect to the securing device influences the alignment of the conductor end sections since, as part of the conductor elements. These are connected to the securing device, on the one hand, and, as described, are accommodated with positive engagement in the through-openings of the mask, on the other hand. In particular, each conductor end section can in this case be moved along the lateral surface of an imaginary cone, similar to the movement of the axis of a gyro during a precession.

It is advantageous if conductor end sections of all the conductor elements end at least adjacent to a machining plane, wherein the circular path extends parallel to the machining plane. The machining plane is an imaginary plane which corresponds exactly or at least approximately to the position of the outermost end of each conductor end section. In the case of a parallel alignment of the conductor end sections, all the conductor end sections normally end exactly in such a machining plane or at least adjacent thereto, provided that the length of all the conductor elements is at least approximately identical. In this way, simultaneous machining of the conductor end sections is simplified if their ends are all arranged in one plane.

As explained above, a particular advantage of the method is that a plurality of conductor end sections can be stripped in parallel in terms of time. In particular, it is possible in the method for the stripping tool to act simultaneously on the conductor end sections of all the conductor elements and to strip them. In this way, increase time efficiency is achieved. It has been found that simultaneous stripping of all the conductor end sections is possible with a single stripping tool with reliable removal of the insulating coating.

Different options are conceivable with regard to the movement of the stripping tool. Thus, the stripping tool could execute a linear, oscillating movement, for example. According to another form, the stripping tool rotates about an axis of rotation during stripping. In this case, the axis of rotation is normally an axis of symmetry of the stripping tool. If stripping is carried out after the insertion of the conductor elements into the coil support, the axis of rotation can extend parallel to an axis of symmetry of the coil support.

The machining surface can advantageously be flat. In the case of a rotating stripping tool, the machining surface extends perpendicularly to the axis of rotation. In this case, the machining surface can have the shape of a circular disk or a circular ring. In particular, by means of a flat machining surface which is arranged parallel to the abovementioned machining plane or in the latter, all the conductor end sections can be brought to the same length if this is not precisely the case at the outset. That is, in addition to stripping, length equalization is also possible. In other words, if not all the conductor end sections end exactly in the machining plane at the outset, this can be provided by means of a flat machining surface. Apart from a flat configuration, there are different possibilities with regard to the geometry of the machining surface, even in the case of a rotating stripping tool. For example, this could be of frustoconical configuration.

In another form, the present disclosure discloses a method of manufacturing a plurality of conductor elements for a hairpin coil. The method comprises providing the plurality of conductor elements, each conductor element including a conductor end section and a securing end section that is spaced apart from the conductor end section, the conductor end section having an electrically insulating surface coating; securing the securing end sections of the conductor elements with respect to each other; securing the conductor end sections of the conductor elements with respect to each other; and simultaneously removing at least a portion of the electrically insulating surface coatings of the conductor end sections using a machining surface of a stripping tool being moved along the conductor end sections.

In yet another form, the present disclosure discloses a method of manufacturing a plurality of conductor elements for a hairpin coil. The method comprises providing the plurality of conductor elements, each conductor element including a conductor end section and a securing end section that is spaced apart from the conductor end section, the conductor end section having an electrically insulating surface coating; securing the securing end sections of the conductor elements with respect to each other using a securing device; securing the conductor end sections of the conductor elements with respect to each other using a mask; simultaneously removing at least a portion of the electrically insulating surface coatings of the conductor end sections using a machining surface of a stripping tool being moved along the conductor end sections; and moving one of the mask and the securing device in a circular path when simultaneously removing the at least a portion of the electrically insulating surface coatings of the conductor end sections.

Further areas of applicability will become apparent from the description provided herein. It should be understood that the description and specific examples are intended for purposes of illustration only and are not intended to limit the scope of the present disclosure.

DRAWINGS

Further advantageous details and effects of the disclosure are explained in detail below by means of various exemplary embodiments illustrated in the figures, of which:

FIG. 4A is a perspective view of an end portion of another conductor element before stripping;

FIG. 4B is a perspective view of the end portion of the conductor element of FIG. 4A after stripping;

FIGS. 9A-9C are perspective views of conductor elements, the first mask, and the securing device during various steps of a first form of a stripping method according to the present disclosure;

Figure 1:
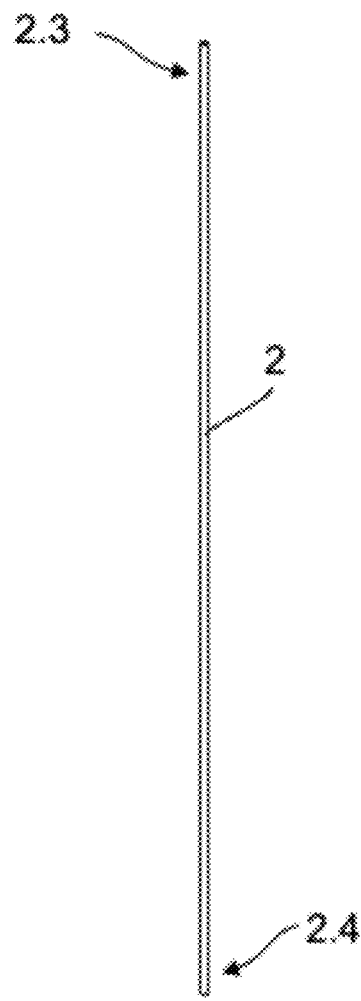
FIG. 1 is a perspective view a conductor element for use in a stripping method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the figures, identical parts are always provided with the same reference signs, for which reason they are generally also only described once.

Figure 2:
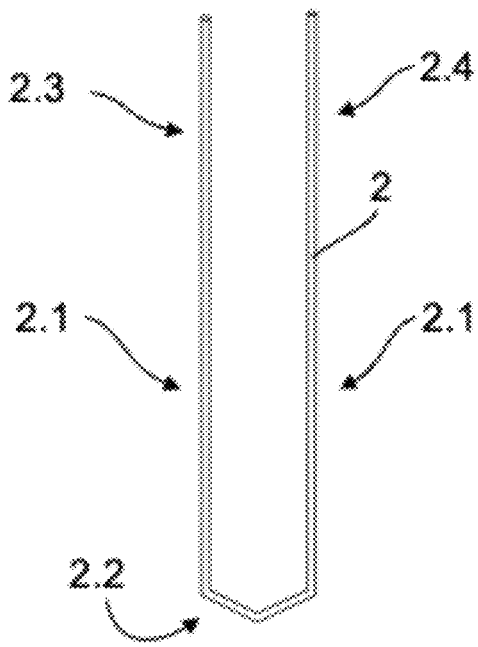
FIG. 2 is a perspective view of the conductor element of FIG. 1 after a bending process.
Figure 3A:
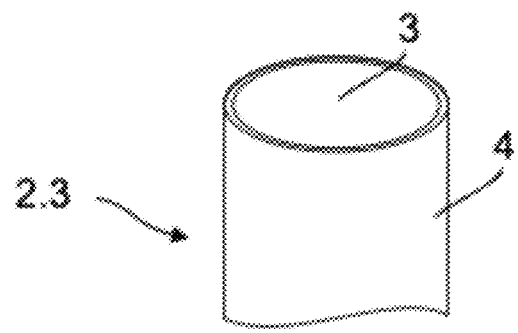
FIG. 3A is a perspective view of an end portion of the conductor element of FIG. 1 before stripping.

FIGS. 1 and 2 show a conductor element 2 which can be used for the production of a hairpin coil 1. The conductor element 2 can be cut off from an endless wire and initially has an extended shape (FIG. 1). By means of one or more bending operations, the conductor element 2 can be converted to the shape shown in FIG. 2, in which it can also be referred to as a hairpin element. In this state, it is of hairpin-like configuration and has two legs 2.1, which are connected by an arched section 2.2. Two conductor end sections 2.3, 2.4 are formed at the end of the legs 2.1. The conductor element 2 is manufactured in one piece and has a core 3 made of copper or a copper alloy and an electrically insulating surface coating 4 (FIG. 3A). The conductor element 2 can have a round cross-section, for example. In some forms, as shown in FIG. 4A, the conductor element 2 may have a rectangular cross-section.

Figure 16:
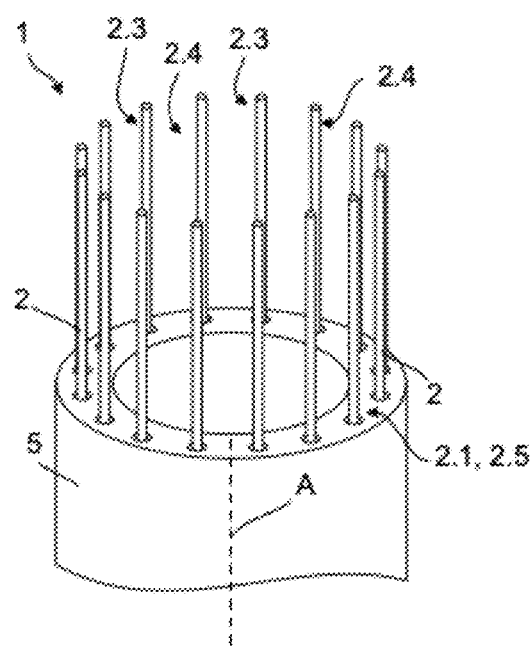
FIG. 16 is a perspective view of a coil support with conductor elements secured thereto.

FIG. 16 shows a plurality of hairpin-shaped conductor elements 2 as part of a hairpin coil 1, which can, for example, be part of a stator for a drive motor of an electric vehicle. The conductor elements 2 of the hairpin coil 1 and of further elements are shown schematically. In particular, the proportions of the conductor elements 2 are generally not reproduced exactly. The hairpin elements 2 have been inserted into a coil support 5, and the conductor end sections 2.3, 2.4 protruding from the coil support 5 extend parallel to an axis of symmetry A of the coil support 5. In order to produce the electrical connections between the conductor elements 2, the conductor end sections 2.3, 2.4 must be bent in accordance with a desired wiring configuration and arranged adjacent to one another, so that they can be welded in a further processing step. In order to be able to carry out this welding, the surface coating 4 must first be at least partially removed.

Figure 5:
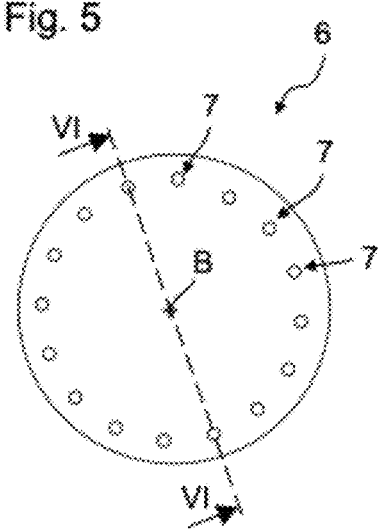
FIG. 5 is a plan view of a first mask for use in the stripping method.
Figure 7:
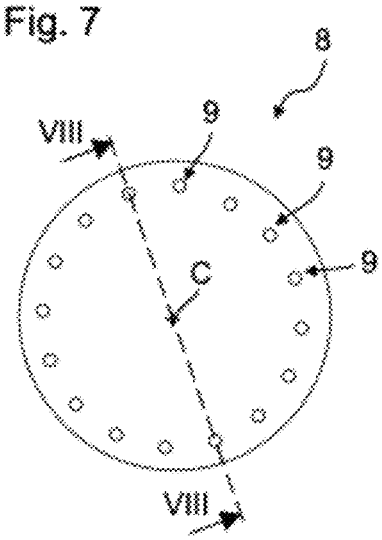
FIG. 7 is a plan view of a securing device for use in the stripping method.
Figure 6:
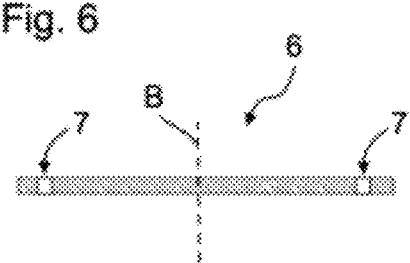
FIG. 6 is a cross-sectional view of the first mark along line VI-VI in FIG. 5.
Figure 8:
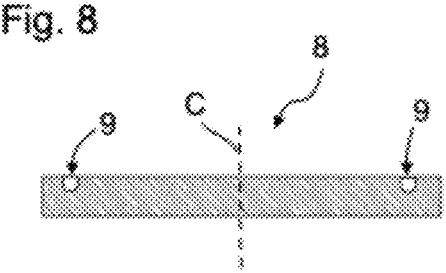
FIG. 8 is a cross-sectional view of the securing device along line VIII-VIII in FIG. 7.

FIGS. 5 and 6 show a mask 6 being made of metal (e.g. stainless steel) or ceramic, which is used in a first form of the stripping method according to the present disclosure. It is configured as a flat circular disk and has a plurality of through-openings 7, which are arranged equidistantly around an axis of symmetry B of the mask 6. The through-openings 7 are configured such that a first conductor end section 2.3 can be received even if a direction of extent V thereof deviates from the axis of symmetry B by a desired inclination. In this exemplary form, a securing plate 8 as shown in FIGS. 7 and 8 is configured similar to the mask 6, as a flat circular disk of metal or ceramic. It has a plurality of blind openings or depressions 9 and an axis of symmetry C. The arrangement of the blind openings 9 corresponds to that of the through-openings 7. The blind openings 9 are configured such that the blind openings 9 can accommodate a second conductor end section 2.4 with positive engagement, even if its direction of extent V is inclined with respect to the axis of symmetry C.

Figure 9B:
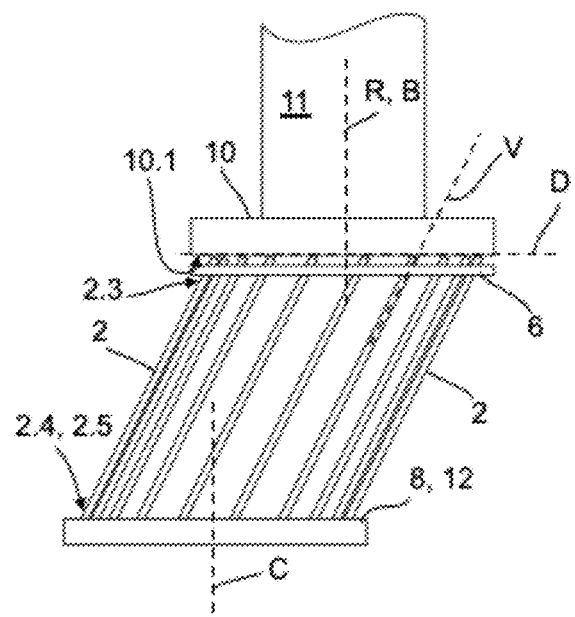
Figure 9C:
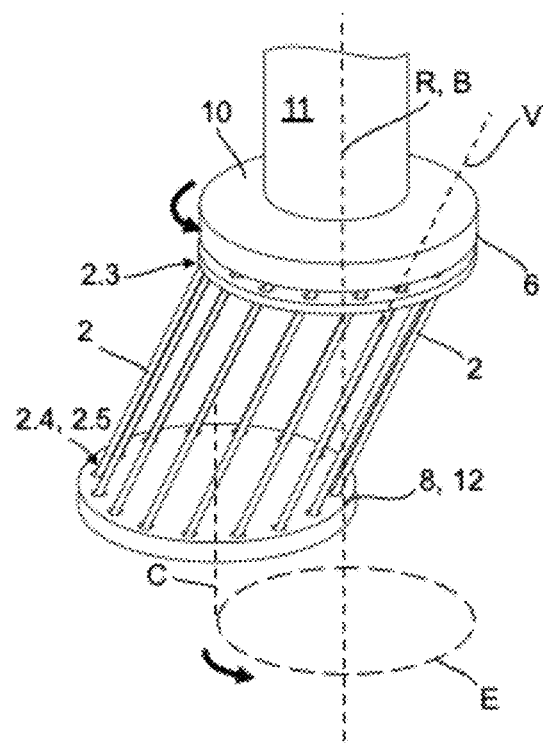

FIGS. 9A to 9C illustrate various steps of the method according to the disclosure according to a first form. As illustrated in FIG. 9A, a plurality of conductor elements 2 of extended configuration are positioned in such a way that their second conductor end sections 2.4 are received in the blind openings 9, while the first conductor end sections 2.4 protrude through the through-openings 2.3. The relative positions of the conductor end sections 2.3 with respect to one another are secured by the positive reception in the through-openings 7. The mask 6 and the securing plate 8 extend parallel to one another (i.e. their respective axes of symmetry B, C run parallel). However, the mask 6 and the securing plate 8 are laterally offset with respect to one another such that the direction of extent V of the conductor elements 2 is inclined at an angle of approximately 30° to the axes of symmetry B, C, for example.

Figure 10:
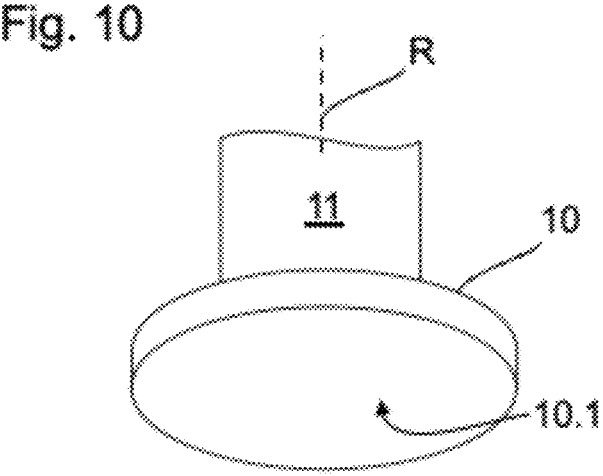
FIG. 10 is a perspective view of a stripping tool for use in a stripping method.

After the relative positions of the first conductor end sections 2.3 have been secured as described above, a grinding disk 10 serving as a stripping tool is brought up to the conductor end sections 2.3 (FIGS. 9B and 9C). The grinding disk 10, which is illustrated in FIG. 10, is fastened to a motor-driven shank 11 and has a flat, circular machining surface 10.1, which extends perpendicularly to an axis of rotation R of the grinding disk 10. The machining surface 10.1 is configured to be abrasive or for material removal and has a hardness which is significantly greater than that of the core 3 and that of the surface coating 4. The axis of rotation R is aligned parallel to the axis of symmetry B of the mask 6 to be more congruent with the latter. Accordingly, the machining surface 10.1 extends in a machining plane D perpendicular to the axis of symmetry B. All the conductor end sections 2.3 end in the machining plane D or directly adjacent thereto (FIG. 9B).

While the machining surface 10.1 is in contact with the first conductor end sections 2.3, it rotates about the axis of rotation R (FIG. 9C) such that part of the respective conductor end section 2.3 is removed by the action of the machining surface 10.1. Insofar as one of the conductor end sections 2.3 protrudes beyond the machining plane D, it is shortened to a predetermined dimension during this process. The conductor end sections 2.3 are oblique relative to the machining surface 10.1 (e.g., the machining surface 10.1 extends at an angle of approximately 60° relative to the direction of extent V of the conductor end sections 2.3). Grinding results in stripping, in which the surface coating 4 is removed in at least some regions. While the first mask 6 is held stationary, the securing plate 8 serving as securing device 12 is moved on a circular path E (FIG. 9C).

Figure 3B:
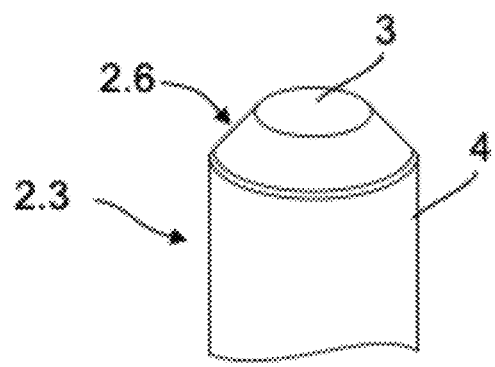
FIG. 3B is a perspective view of the end portion of the conductor element of FIG. 1 after stripping.
Figure 11:
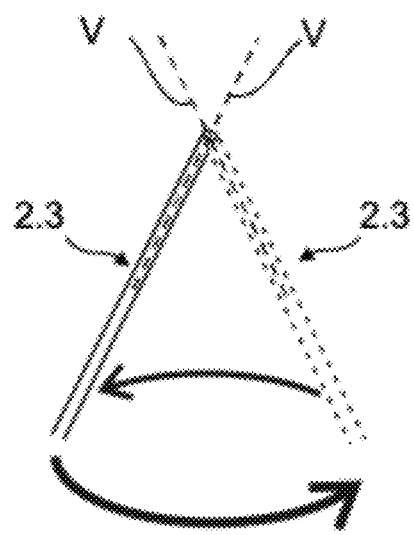
FIG. 11 is a schematic view showing movement of a conductor end section during the stripping process.

As a result of the movement of the securing plate 8, the position of each first conductor end section 2.3 is successively changed. Here, the second conductor end sections 2.4 received in the blind openings 9 serve as securing sections 2.5, by means of which the conductor elements 2 are supported and guided. Each of the first conductor end sections 2.3 moves approximately along the surface of a cone as shown in FIG. 11. It is also possible to compare the movement of the conductor end sections 2.3 with the movement of a gyroscopic axis in the case of a precession. During the process, the first conductor end sections 2.3 of the conductor elements 2 remain parallel to one another, and the angle between the direction of extent V and the machining surface 10.1 does not change. Due to the securing plate 8 moving in the circular path E, however, different parts of the respective conductor end sections 2.3 are gradually engaged by the machining surface 10.1, and in each case sectional removal of the surface coating 4 and of part of the core 3 occurs. After the securing plate 8 has passed once completely through the circular path E, a circumferential chamfer 2.6 has been formed at each conductor end section 2.3 by the action of the machining surface 10.1. As illustrated in FIG. 3B, its shape corresponds to a truncated cone with an opening angle of approximately 120° (corresponding to twice the angle between the direction of extent V and the machining surface 10.1). If, as shown in FIG. 4A, the conductor elements 2 have a rectangular cross section, the securing plate 8 can likewise run through the circular path E, although the grinding disk 10 acts on the conductor end sections 2.3 only in certain orientations, while it is lifted off between them. Thus, the shape of a truncated pyramid illustrated in FIG. 4B can be formed, although the chamfer 2.6 is once again formed in such a way as to encircle the first conductor end section 2.3.

After the stripping of the first conductor end sections 2.3, the grinding disk 10 is moved away again, and the conductor elements 2 are removed from the mask 6 and the securing plate 8. The conductor elements 2 can then be reversed, thus allowing corresponding stripping of the second conductor end sections 2.4 to take place. As illustrated in FIG. 2, the conductor elements 2 can then be converted to a hairpin-like shape and, as illustrated in FIG. 16, can be inserted into the coil support 5. In the further course of the process, the conductor end sections 2.3, 2.4 are bent in accordance with a desired wiring configuration and arranged adjacent to one another, so that they can be welded in a further processing step.

In the case of the mask 6 shown in FIG. 5, the through-openings 7 are positioned on the inside (i.e. the through-openings 7 are bounded all round by the mask 6). The conductor end sections 2.3 must therefore be passed through the through-openings 7 transversely to the plane of extent of the mask 6. Alternatively, for example, the mask 6 shown in FIG. 12 can be used, in which the through-openings 7 are open at the edge, thus allowing the conductor end sections 2.3 to be introduced parallel to the plane of extent of the mask 6. The cross section of the through-openings 7 tapers inward toward a desired position of the respective conductor end sections 2.3, making the introduction thereof easier. All the through-openings 7 extend obliquely (i.e., radially-tangentially) inward, thus allowing the conductor end sections 2.3 to be introduced by means of a rotary movement of the mask 6 about the axis of symmetry B, for example. The mask 6 shown here can be used in combination with the securing plate 8 illustrated in FIG. 7.

Figure 12:
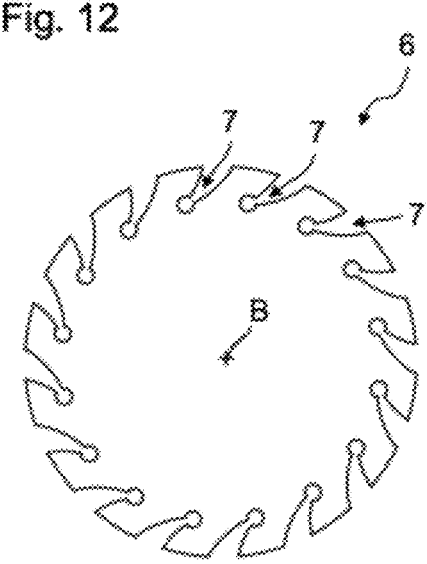
FIG. 12 is a plan view of a second mask for use in the stripping method.
Figure 13:
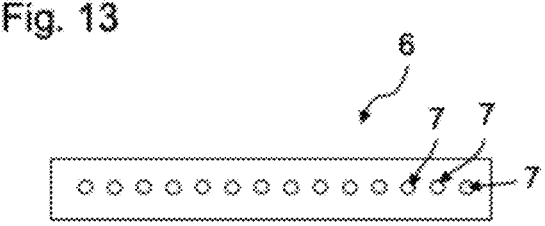
FIG. 13 is a plan view of a third mask for use in the stripping method.
Figure 14:
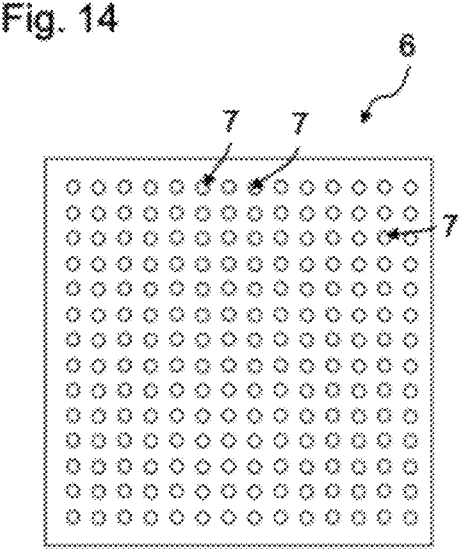
FIG. 14 is a plan view of a fourth mask for use in the stripping method.

While the masks 6 shown in FIG. 6 and FIG. 12 have a cross section resembling a circle, and the through-openings 7 are also arranged in a circular manner, various other geometrical configurations can also be used to advantage, such as, for example, the mask 6 illustrated in FIG. 13, which has an elongated, rectangular cross section, wherein the through-openings 7 are arranged along a straight line. In this case, a securing plate 8 with a comparable cross section and a corresponding arrangement of the blind openings 9 can be used. In addition to a rotating grinding disk 10, a linearly oscillating grinding disk or plate can also be used as the stripping tool, for example. FIG. 14 shows a further form of a mask 6, which has a square cross section with a large number of through-openings 7, which are arranged in the manner of a rectangular grid. It is shown in FIG. 14 that a securing plate 8 which is adapted in terms of geometry is used.

Figure 15A:
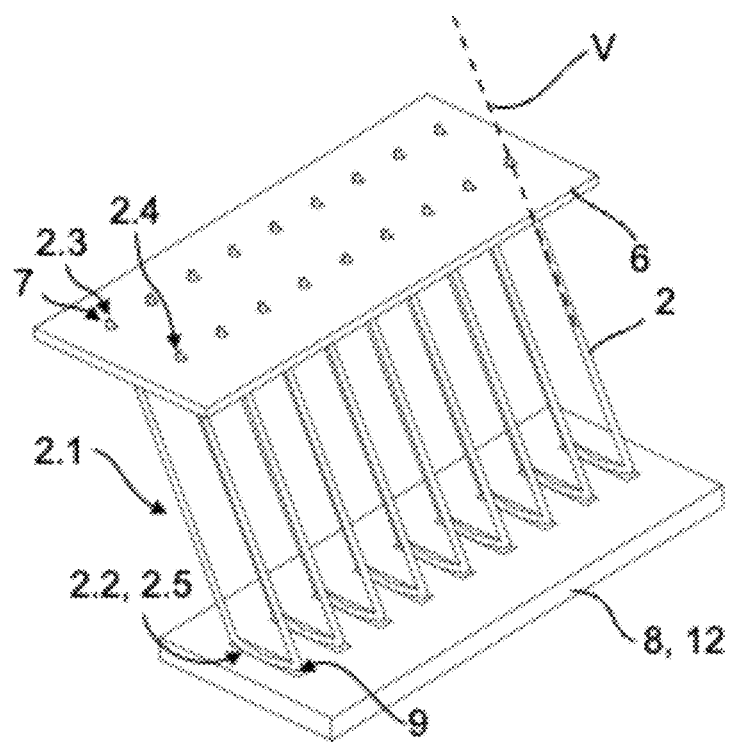
FIGS. 15A-15B are perspective views of conductor elements, a mask, and a securing plate during various steps of a second form of a stripping method according to the present disclosure.
Figure 15B:
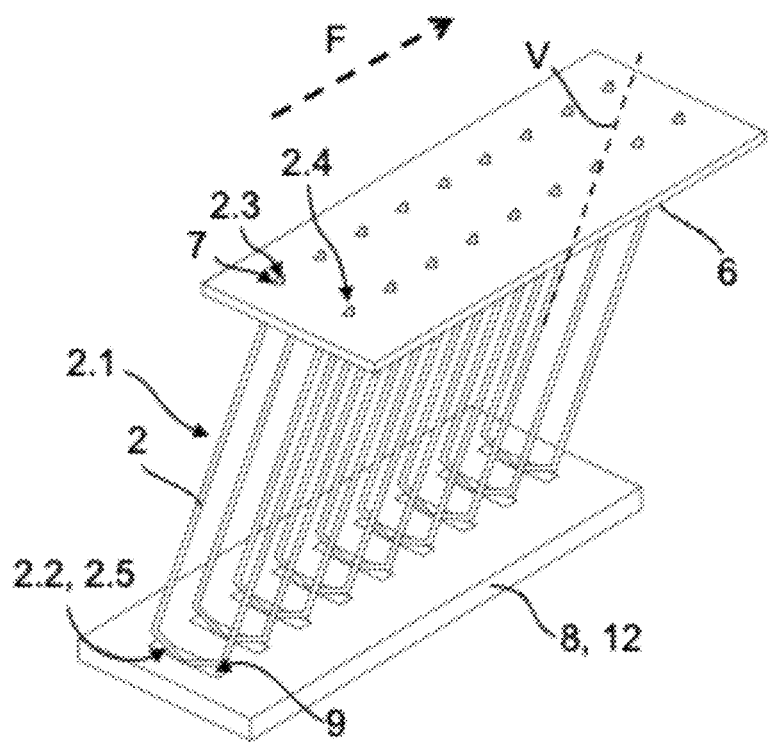

FIGS. 15A and 15B show steps of a second form of the stripping method according to the present disclosure. In this case, the conductor elements 2 are not stripped in the extended state illustrated in FIG. 1 but already in their hairpin-like shape according to FIG. 2. In this case, the arched sections 2.2 are accommodated in elongate blind openings 9 of a rectangular securing plate 8. In this case, the arched sections 2.2 thus function as securing sections 2.5. Both the first conductor end sections 2.3 and the second conductor end sections 2.4 are passed through through-openings 7 of a likewise rectangular mask 6. The mask 6 and the securing plate 8 are arranged in such a way that a direction of extent V of the respective conductor end sections 2.3, 2.4 extends oblique to the plane of extent of the mask 6. In this case, all the conductor end sections 2.3, 2.4 are arranged parallel to one another. By means of a stripping tool (not illustrated), material is first of all removed on one side of the conductor end sections 2.3, 2.4 in the position shown in FIG. 15A, as a result of which a chamfer is formed. The stripping tool is then removed and the mask 6 is adjusted linearly along an adjustment direction F, as a result of which it reaches the position illustrated in FIG. 15B. After this, the stripping tool is again moved up to the conductor end sections 2.3, 2.4 and machines them to remove material, thereby likewise giving rise to a chamfer on an opposite side. In the form illustrated here, the surface coating 4 is not removed on all sides of the conductor end section 2.3, 2.4, but nevertheless to a large extent, in particular if the conductor elements 2 have the rectangular cross section illustrated in FIG. 4A. Depending on the type of welding method used, this may be sufficient. It should be noted that the conductor end sections 2.3, 2.4 all end in a machining plane (not shown specifically in FIGS. 15A and 15B), thereby allowing them to be machined and stripped simultaneously in an efficient manner overall.

Figure 17:
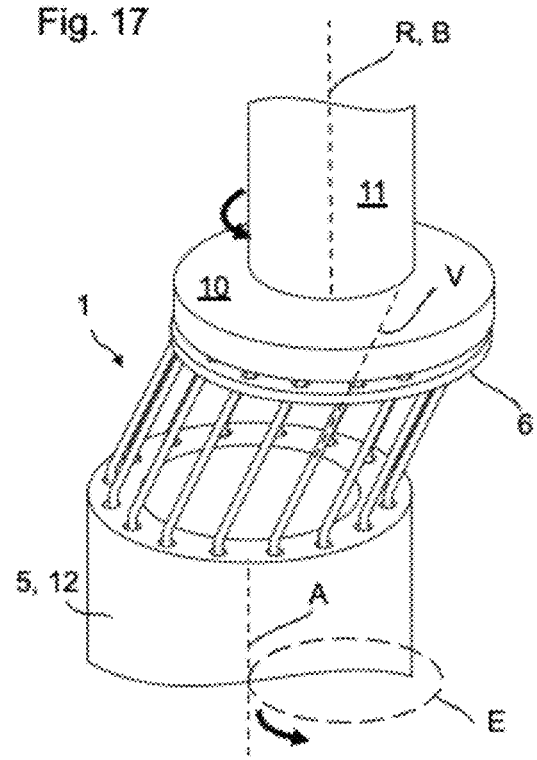
FIG. 17 is a perspective view of a mask and a coil support with conductor elements secured thereto during a step of a third form of the method according to the present disclosure.

FIG. 17 shows schematically a section through a third form of the method according to the present disclosure. In this case, the stripping of the conductor end sections 2.3, 2.4 takes place after the hairpin-shaped conductor elements 2 have already been inserted into the coil support 5, which here forms a securing device 12 (or a part thereof). In this case, parts of the legs 2.1 form securing sections 2.5. In order to inhibit displacement of the conductor elements 2 within the coil support 5, they can be supported in the region of the arched sections 2.2 in a manner not shown here. The conductor end sections 2.3, 2.4 are passed through through-openings 7 of a mask configured in accordance with FIG. 5. Thereafter, the coil support 5 is guided eccentrically with respect to the mask 6 along a circular path E, as a result of which the direction of extent of the conductor end sections 2.3, 2.4 runs at an angle to the axis of symmetry A of the coil support 5, while their alignment changes continuously. That is, the respective conductor end section 2.3, 2.4 moves on an imaginary cone, as illustrated in FIG. 11. In a manner similar to that illustrated in FIG. 9C, the conductor end sections 2.3, 2.4 are machined during this process by the rotating grinding disk 10. In this form, large parts of the hairpin-shaped conductor element 2 are accommodated with positive engagement within the coil support 5, with the result that it is not freely movable. For this reason, the conductor end sections 2.3, 2.4 must be bent continuously in order to achieve the described change in the direction of extent V. In this way, there is a great advantage in that the stripping can be carried out directly on the coil support 5, thereby making the entire production process of the hairpin coil 1 simpler and, in addition, eliminating the need for a securing plate 8.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a plurality of conductor elements, the method comprising:
   providing the plurality of conductor elements, each conductor element including a conductor end section having an electrically insulating surface coating;
   securing the conductor end sections of the conductor elements with respect to each other using a mask;
   simultaneously removing at least a portion of the electrically insulating surface coatings of the conductor end sections using a machining surface of a stripping tool being moved along the conductor end sections; and moving the conductor end sections with respect to the machining surface during simultaneously removing the at least a portion of the electrically insulating surface coatings of the conductor end sections, wherein the stripping tool rotates about an axis of rotation during simultaneously removing the at least a portion of the electrically insulating surface coatings of the conductor end sections.

2. The method according to claim 1, wherein securing the conductor end sections of the conductor elements with respect to each other comprises inserting the conductor end sections through respective openings formed in the mask such that the conductor end sections protrude through the respective openings.

3. The method according to claim 2, wherein the conductor end sections extend parallel to each other prior to the conductor end sections being secured with respect to each other, and wherein the machining surface extends oblique with respect to the conductor end sections during simultaneously removing the at least a portion of the electrically insulating surface coatings of the conductor end sections with the machining surface.

4. The method according to claim 1, wherein the conductor end sections extend parallel to each other prior to the conductor end sections being secured with respect to each other, and wherein the machining surface extends oblique with respect to the conductor end sections during simultaneously removing the at least a portion of the electrically insulating surface coatings of the conductor end sections with the machining surface.

5. The method according to claim 4, wherein the conductor elements further comprise securing sections that are spaced apart from and opposed to the conductor end sections, and wherein the securing sections are secured with respect to each other by a securing device.

6. The method according to claim 1, wherein the conductor end sections are held parallel to each other during simultaneously removing the at least a portion of the electrically insulating surface coatings of the conductor end sections such that positions of the conductor end sections move with respect to the machining surface.

7. The method according to claim 1, wherein the conductor elements further comprise securing sections that are spaced apart from the conductor end sections, and wherein the securing sections are secured with respect to each other by a securing device.

8. The method according to claim 1, wherein each conductor element further comprises a securing end section that opposes the conductor end section.

9. The method according to claim 1, wherein:
securing the conductor end sections of the conductor elements with respect to each other comprises inserting the conductor end sections through respective openings formed in the mask such that the conductor end sections protrude through the respective openings;
the conductor elements further comprise securing sections that are spaced apart from the conductor end sections, the securing sections are secured with respect to each other by a securing device; and
one of the mask or the securing device moves in a circular path relative to the other of the mask or the securing device during simultaneously removing the at least a portion of the electrically insulating surface coatings of the conductor end sections such that positions of the conductor end sections move with respect to the securing device.

10. The method according to claim 9, wherein the conductor end sections are positioned adjacent to a machining plane, and wherein the machining plane extends parallel to the one of the mask or the securing device moving in the circular path.

11. The method according to claim 1, wherein the conductor end sections are positioned adjacent to a machining plane, and wherein the machining plane extends parallel to one of the mask or a securing device moving in a circular path.

12. The method according to claim 1, wherein the machining surface is flat.

13. A method of manufacturing a plurality of conductor elements, the method comprising:
providing the plurality of conductor elements, each conductor element including a conductor end section and a securing end section that is spaced apart from and opposed to the conductor end section, the conductor end section having an electrically insulating surface coating;
securing the securing end sections of the conductor elements with respect to each other;
securing the conductor end sections of the conductor elements with respect to each other using a mask; and
simultaneously removing at least a portion of the electrically insulating surface coatings of the conductor end sections using a machining surface of a stripping tool being moved along the conductor end sections,
moving the conductor end sections with respect to the machining surface during simultaneously removing the at least a portion of the electrically insulating surface coatings of the conductor end sections,
wherein the stripping tool rotates about an axis of rotation during simultaneously removing the at least a portion of the electrically insulating surface coatings of the conductor end sections.

14. The method according to claim 13, wherein securing the conductor end sections of the conductor elements with respect to each other comprises inserting the conductor end sections through respective openings formed in the mask such that the conductor end sections protrude through the respective openings.

15. The method according to claim 13, wherein the conductor end sections extend parallel to each other prior to the conductor end sections being secured with respect to each other, and wherein the machining surface extends oblique with respect to the conductor end sections during simultaneously removing the at least a portion of the electrically insulating surface coatings of the conductor end sections with the machining surface.

16. The method according to claim 13, wherein the conductor end sections are positioned adjacent to a machining plane, and wherein the machining plane extends parallel to one of the mask or a securing device moving in a circular path.

17. The method according to claim 13, wherein the machining surface is flat.

18. A method of manufacturing a plurality of conductor elements, the method comprising:
providing the plurality of conductor elements, each conductor element including a conductor end section and a securing end section that is spaced apart from and opposed to the conductor end section, the conductor end section having an electrically insulating surface coating;

securing the securing end sections of the conductor elements with respect to each other using a securing device;

securing the conductor end sections of the conductor elements with respect to each other using a mask;

simultaneously removing at least a portion of the electrically insulating surface coatings of the conductor end sections using a machining surface of a stripping tool being moved along the conductor end sections; and moving one of the mask or the securing device in a circular path when simultaneously removing the at least a portion of the electrically insulating surface coatings of the conductor end sections, moving the conductor end sections with respect to the machining surface during simultaneously removing the at least a portion of the electrically insulating surface coatings of the conductor end sections, wherein the stripping tool rotates about an axis of rotation during simultaneously removing the at least a portion of the electrically insulating surface coatings of the conductor end sections.

* * * * *